United States Patent
Kulkarni et al.

(10) Patent No.: US 11,197,426 B2
(45) Date of Patent: Dec. 14, 2021

(54) BALER WITH REMOVABLE SIDEWALLS

(71) Applicant: Deere & Company, Moline, IL (US)

(72) Inventors: Nikhil Kulkarni, Pune (IN); Darin L. Roth, Batavia, IA (US); Timothy J. Kraus, Blakesburg, IA (US); Jeremy M. Erdmann, Floris, IA (US)

(73) Assignee: DEERE & COMPANY, Moline, IL (US)

( * ) Notice: Subject to any disclaimer, the term of this patent is extended or adjusted under 35 U.S.C. 154(b) by 167 days.

(21) Appl. No.: 16/509,358

(22) Filed: Jul. 11, 2019

(65) Prior Publication Data

US 2021/0007286 A1   Jan. 14, 2021

(51) Int. Cl.
*A01F 15/04* (2006.01)
*A01F 15/08* (2006.01)

(52) U.S. Cl.
CPC ................. *A01F 15/046* (2013.01)

(58) Field of Classification Search
CPC ........ A01F 15/046; A01F 15/08; A01F 15/04; B30B 9/30; B30B 9/3032; B30B 9/3025; B30B 9/3046
See application file for complete search history.

(56) References Cited

U.S. PATENT DOCUMENTS

| | | | | |
|---|---|---|---|---|
| 728,516 | A * | 5/1903 | Trabue | A01F 15/0825 100/191 |
| 2,596,872 | A * | 5/1952 | Skromme | A01F 15/0825 100/191 |
| 3,424,081 | A * | 1/1969 | Hoke | A01F 15/0825 100/192 |
| 3,487,774 | A * | 1/1970 | Duerksen | A63H 17/05 100/189 |
| 3,985,072 | A * | 10/1976 | Van Doorn | B30B 9/3032 100/255 |
| 4,354,430 | A * | 10/1982 | Horiuchi | A01F 15/0825 100/192 |
| 4,788,901 | A * | 12/1988 | Klinner | A01F 15/02 100/100 |
| 5,461,975 | A * | 10/1995 | Driggs | B30B 9/3032 100/188 R |
| 2003/0029331 | A1* | 2/2003 | Boucher | A01F 15/145 100/8 |

FOREIGN PATENT DOCUMENTS

| | | |
|---|---|---|
| BE | 837346 A | 5/1976 |
| CA | 2137715 A1 | 6/1996 |
| DE | 4032393 A1 | 5/1991 |
| DE | 290125 B5 * | 9/1993 |

OTHER PUBLICATIONS

English translate (DD290125B5), retrieved date Jun. 2, 2021.*
European Search Report issued in counterpart application No. 20183677.2 dated Nov. 10, 2020 (07 pages).

* cited by examiner

*Primary Examiner* — Adam J Eiseman
*Assistant Examiner* — Mohammed S. Alawadi
(74) *Attorney, Agent, or Firm* — Michael Best & Friedrich LLP

(57) ABSTRACT

A baler including a frame having a first end, and a second end opposite the first end. The baler also having a compression chamber, where the compression chamber defines a central axis extending longitudinally therethrough, a plunger assembly at least partially positioned and movable within the compression chamber, and a panel removably coupled to the frame, and where the panel at least partially defines the compression chamber.

8 Claims, 13 Drawing Sheets

BALER WITH REMOVABLE SIDEWALLS

BACKGROUND

The present disclosure relates to an agricultural baler having a compression chamber with removable sidewalls.

SUMMARY

During operation of a square baler a plunger reciprocates within a compression chamber to compress crop material and form bales. During this process, the movement of the plunger within the compression chamber exerts various forces against the sidewalls of the compression chamber causing them to wear and deform.

In one implementation the baler includes a frame having a first end, and a second end opposite the first end, a compression chamber where the compression chamber defines a central axis extending longitudinally therethrough, a plunger assembly at least partially positioned and movable within the compression chamber, and a panel removably coupled to the frame, and where the panel at least partially defines the compression chamber.

In another implementation, the baler includes a frame having a first end, and a second end opposite the first end, a compression chamber at least partially defined by an interior surface, and where at least a portion of the interior surface is removable, and a plunger assembly at least partially positioned within and movable relative to the compression chamber.

In another implementation, a baler including a frame, a plunger assembly including a plunger movable with respect to the frame between a first position and a second position to define a stroke region therebetween, and where the movement of the plunger between the first position and the second position defines a stroke axis, a compression chamber at least partially enclosing the stroke region, and wherein the compression chamber is at least partially defined by one or more panels, and where at least one of the one or more panels is movable relative to the frame.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a baler, and more particularly to rectangular baler having a compression chamber defined by an interior surface that is at least partially removable. More specifically, the interior surface of the compression chamber is produced by one or more panels removably coupled to an underlying frame. During use, the user is able to remove and replace one or more of the panels as necessary to repair panels subject to excessive wear and/or damage caused by the baling process. By allowing the panels to be removed from the frame of the baler (e.g., using fasteners and the like), the user can better maintain the integrity of the compression chamber without having to cut into or significantly alter the underlying frame of the baler.

Figure 1:
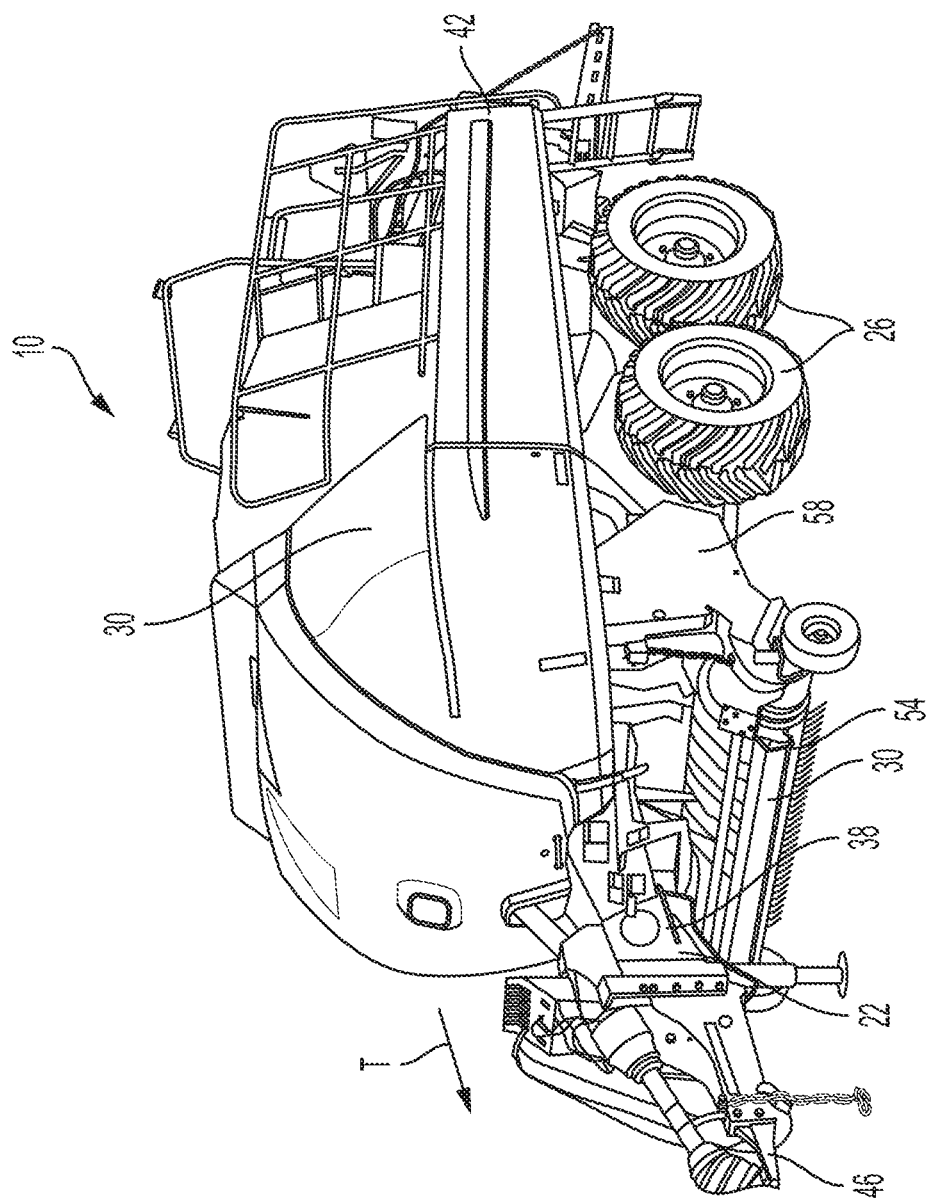
FIG. 1 is a perspective view of a large square baler with a compression chamber having one or more removable side walls.

FIG. 1 illustrates a large square baler 10 configured to collect and compress crop material 14 into individual, rectangular bales (not shown). The baler 10 includes a frame 22, one or more wheels 26 mounted on the frame 22, a feed system 30 coupled to the frame 22, and a compression system 34 to receive and compress crop material 14 provided by the feed system 30.

The frame 22 of the baler 10 is generally formed from a series of interconnected rigid members and includes a first or front end 38 oriented generally in the direction of travel T, and a second or rear end 42 opposite the first end 38. The frame 22 also includes a tow bar 46 extending outwardly from the frame 22 from the first end 38 and connectable to a towing vehicle (not shown) such as an agricultural tractor or other vehicle. While the illustrated implementation is configured to be towed, it is to be understood that the baler may also be self-propelled.

Figure 2:
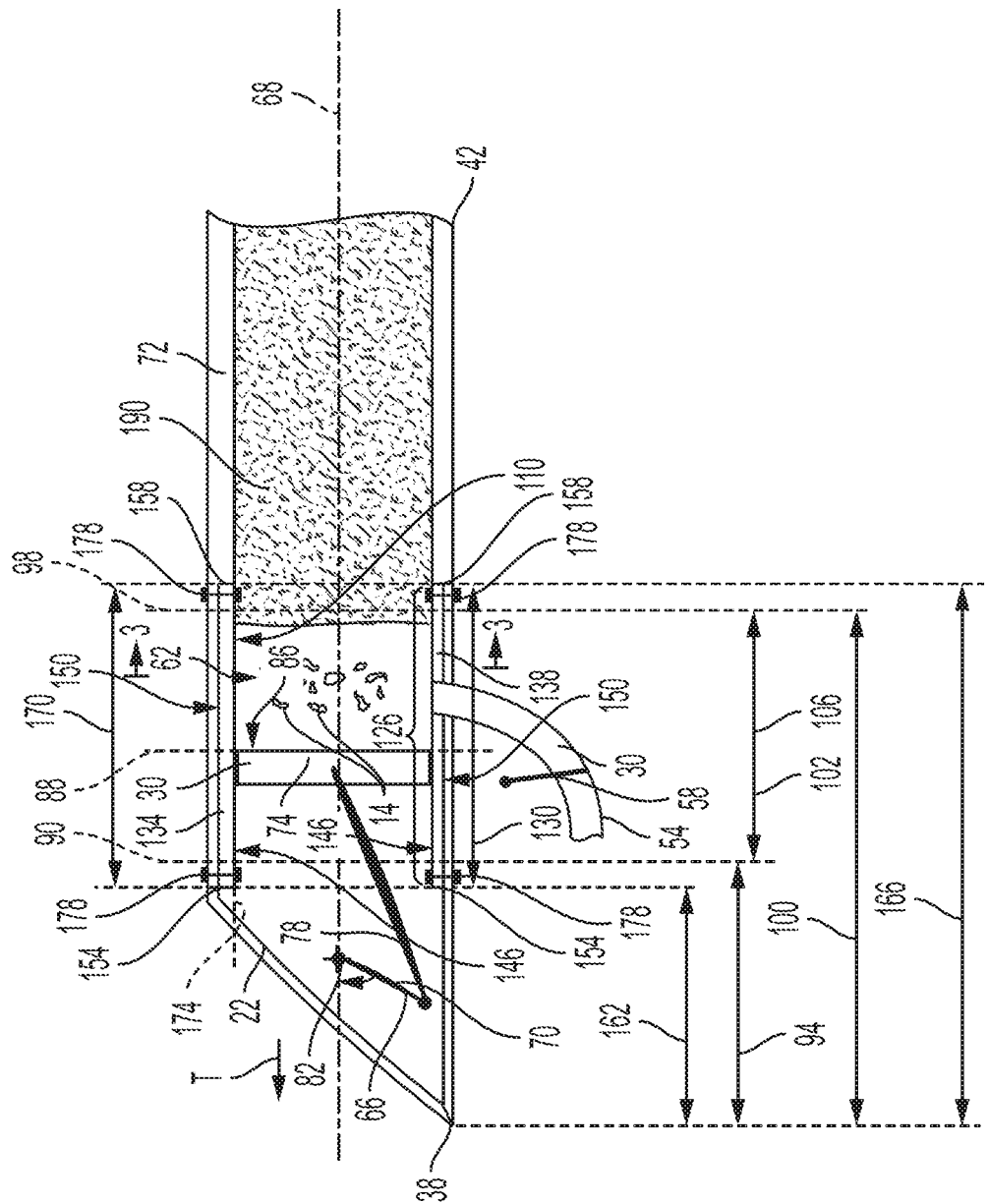
FIG. 2 is a cross-sectional schematic view of the baler of FIG. 1 taken along a longitudinal axis of the compression chamber.

As shown in FIGS. 1 and 2, the feed system 30 of the baler 10 is configured to pick up crop material 14 from a support surface (not shown) and convey the crop material 14 to the compression system 34. In the illustrated implementation, the feed system 30 includes a pickup assembly 54 for receiving the crop material 14 from the support surface 50, and a delivery assembly 58 for directing the collected crop material 14 to the compression system 34.

Referring now to FIGS. 2-10, the compression system 34 includes a compression chamber 62 open to and configured to receive crop material from the feed system 30, a plunger assembly 66 at least partially positioned within the compression chamber 62 and configured to move with respect thereto, and a bale case 72. The compression system 34 also defines a longitudinal or central axis 68 extending along the length of the compression chamber 62 (e.g., parallel to the direction of travel T) and generally positioned at the cross-sectional center thereof.

The plunger assembly 66 of the compression system 34 includes a rotational input or crank arm 70, a plunger 74 at least partially positioned within and movable with respect to the compression chamber 62, and one or more connecting rods 78 each extending between and coupled to both the crank arm 70 and the plunger 74 to transmit force therebetween. As shown in FIG. 2, the crank arm 70 is configured to rotate about a crank axis 82 positioned proximate the first end 38 of the frame 22.

The plunger 74 of the plunger assembly 66 includes a compression surface 86 configured to engage crop material 14 positioned within the compression chamber 62. The plunger 74 also defines a compression plane 88 aligned with the compression surface 86. During use, the plunger 74 is positioned within and movable with respect to the compression chamber 62 between front-dead-center position (FDC) 90, in which the compression surface 86 of the plunger 74 is closest to the first end 38 of the frame 22 (e.g., the compression surface 86 is a first distance 94 from the first end 38), and a rear-dead-center position (RDC) 98 in which the compression surface 86 of the plunger 74 is positioned its furthest distance from the first end 38 (e.g., the compression surface 86 is a second distance 100 from the first end 38 greater than the first distance 94; see FIG. 2). In the illustrated implementation, the plunger 74 translates within the compression chamber 62 along the longitudinal axis 68 between the RDC 98 and FDC 90. The plunger 74 also defines a stroke length 102, defined as the distance between RDC 98 and FDC 90, and a plunger stroke region 106, defined as the volume of space located between RDC 98 and FDC 90.

While the illustrated plunger assembly 66 uses a crank arm and connecting arm to produce the resulting reciprocating motion (described above), it is to be understood that in alternative implementations, alternative forms and types of drive assembly may be used to move the plunger 74 as described above.

Figure 3:
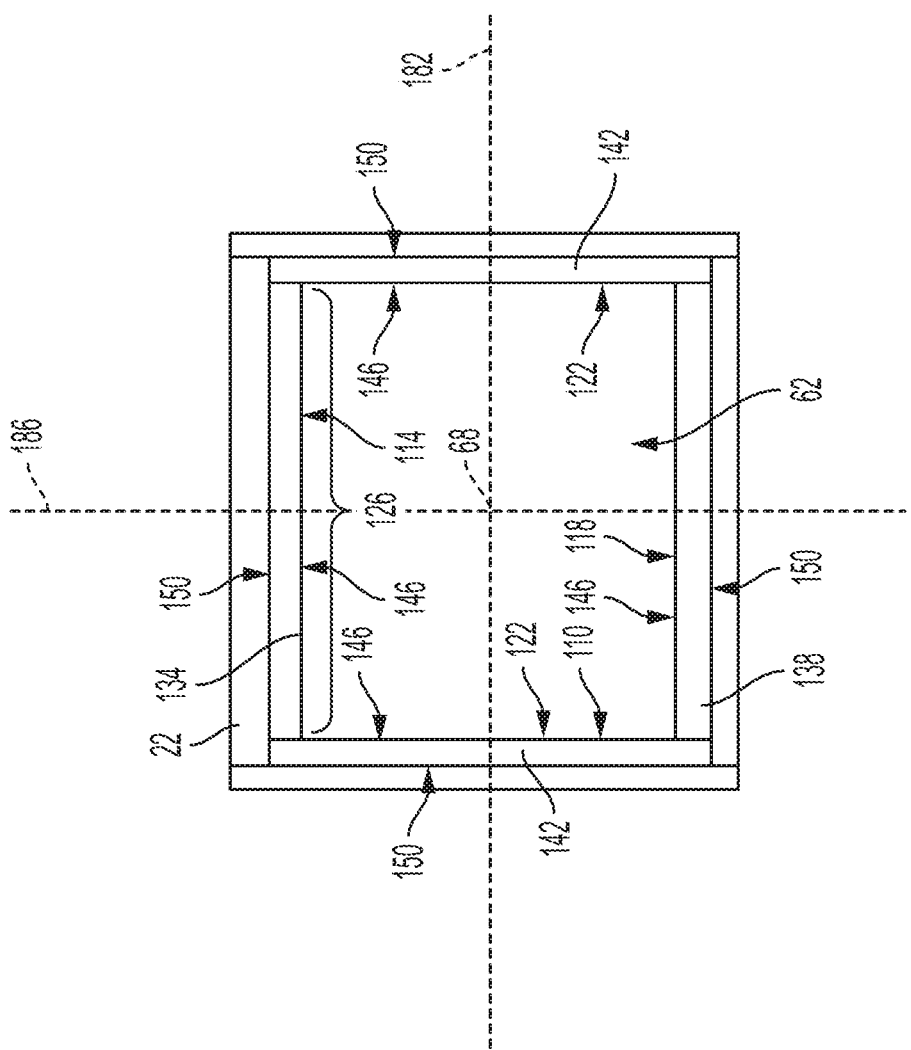
FIG. 3 is a section view taken along line 3-3 of FIG. 2.

Illustrated in FIGS. 2 and 3, the compression chamber 62 of the baler 10 is at least partially defined by an interior surface 110. More specifically, the interior surface 110 includes a top surface 114, a bottom surface 118 opposite the top surface 114, and a pair of side surfaces 122 extending between the top surface 114 and the bottom surface 118. Together, the top, bottom, and side surfaces 114, 118, 122 define the compression chamber 62 as an elongated channel that is open on at least one end to the bale case 72 and that includes a substantially constant rectangular cross-sectional shape taken perpendicular to the longitudinal axis 68 (see FIG. 3). While the illustrated compression chamber 62 is substantially rectangular-prism in shape, in alternative implementations, other sizes and shapes of compression chamber 62 may be present.

During use, at least a portion of the interior surface 110 of the compression chamber 62 is removable in the form of one or more removable regions 126. As shown in FIG. 2, at least a portion of the interior surface 110 enclosing the plunger stroke region 106 is removable. Each removable region 126, in turn, defines an axial length 130 measured along the longitudinal axis 68. In the illustrated implementation, the axial length 130 of at least one of the removable regions 126 is greater than the stroke length 102 of the plunger 74. Furthermore, the removable region 126 is positioned such that a first portion of the removable region 126 falls within the plunger stroke region 106, and a second portion of the removable region 126 falls outside the plunger stroke region 106 (see FIG. 2).

As shown in FIGS. 2-10, the interior surface 110 of the present implementation is produced by one or more panels 134, 138, 142, each removably coupled to the frame 22. More specifically, the top surface 114 is generally produced by a top wall panel 134, the bottom surface 118 is generally produced by a bottom wall panel 138, and the side surfaces 122 are generally produced by a pair of side wall panels 142 (see FIG. 3). In the illustrated implementation, each panel 134, 138, 142 defines at least a portion of the interior surface 110 defining the plunger stroke region 106 such that a first portion of each panel 134, 138, 142 is positioned inside the stroke region 106 and a second portion of each panel 134, 138, 142 is positioned outside the stroke region 106. In some implementations, the panels 134, 138, 142 may be sized and shaped to correspond with relatively high-wear regions of the compression chamber 62. Such high-wear regions may include, but are not limited to, areas of the compression chamber 62 where the highest force load is exerted upon the interior surface 110 (e.g., the max load point), regions where the frictional sliding between the plunger 74 and interior surface 110 is highest (e.g., max wear point), and the like. For example, the max wear point or region may be located near the RDC 98 as the friction against the interior surface 110 is proportional to the amount to which the crop is compressed.

While the illustrated implementation includes four wall panels (e.g., one panel for each planar surface of the rectangular cross-sectional shape), in alternative implementations more or fewer panels may be present. For example, any one of the top, bottom, and/or side wall panels 134, 138, 142 may actually be formed from multiple adjacent and aligned panels (e.g., side by side) subdivided in the axial direction (e.g., along the longitudinal axis 68), the traverse direction (e.g., perpendicular to the longitudinal axis 68), or both. In such implementations, various sub-combinations of the multiple adjacent panels may be fixedly or removably coupled to the frame 22. In other examples, one or more of the panels 134, 138, 142 may include a sub-panel (not shown) allowing a sub-region of the corresponding panel to be detached from the underlying panels 134, 138, 142. In such examples, the location, size, and shape of the sub-regions forming the sub-panels may generally correspond with relatively high-wear regions of the compression chamber 62 (described above).

Each wall panel 134, 138, 142 of the compression chamber 62 includes a substantially plate-like body (e.g., a steel plate) having a first surface 146 corresponding to and forming at least a portion of the interior surface 110, and a second surface 150 opposite the first surface 146. Each wall panel 134, 138, 142 also includes a leading edge or point 154, defined as the edge or point closest to the first end 38 of the frame 22, and a trailing edge or point 158 opposite the leading edge 154 and generally defined as the edge or point furthest from the first end 38. As shown in FIG. 2, the leading edge 154 is located a third distance 162 from the first end 38 while the trailing edge 158 is located a fourth distance 166 from the first end 38 greater than the third distance 162. While each wall panel 134, 138, 142 of the illustrated implementation is substantially quadrilateral in shape, it is to be understood that in alternative implementations one or more of the wall panels 134, 138, 142 may take on other shapes and sizes such as but not limited to rounded, polygonal, and the like.

Figure 7:
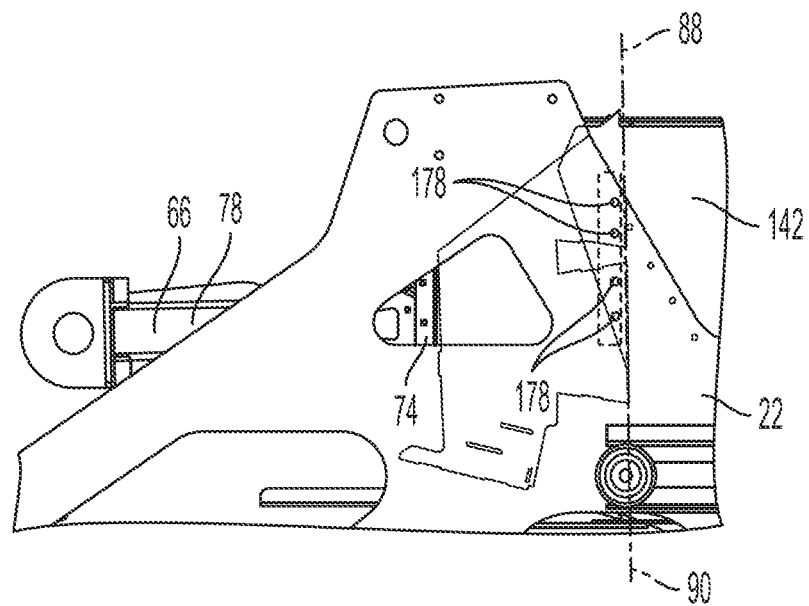
FIGS. 7 and 8 illustrate the frame and compression assembly of FIG. 5 in a front dead center position.
Figure 8:
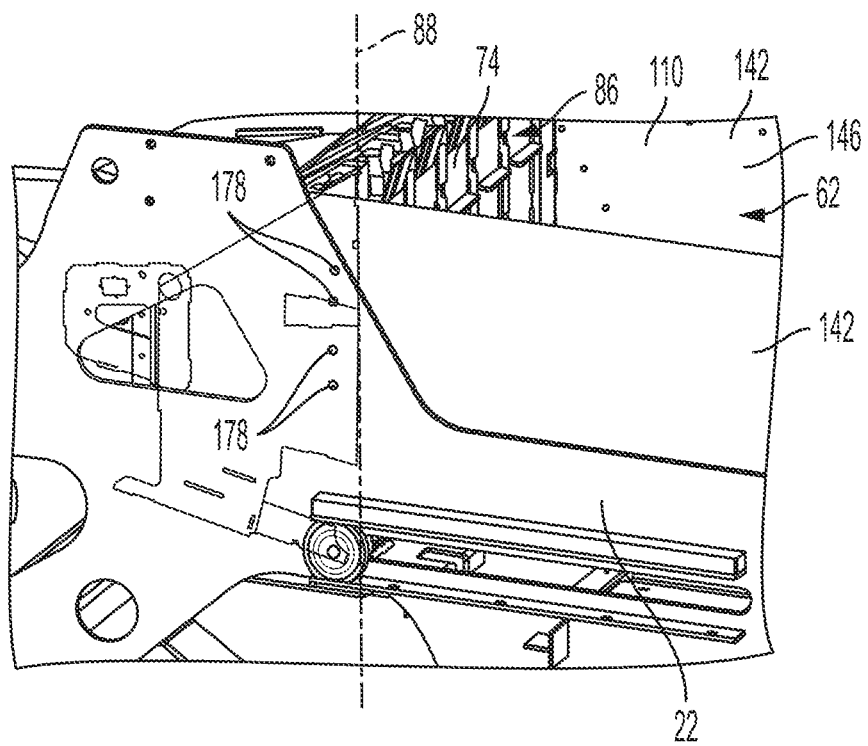
Figure 9:
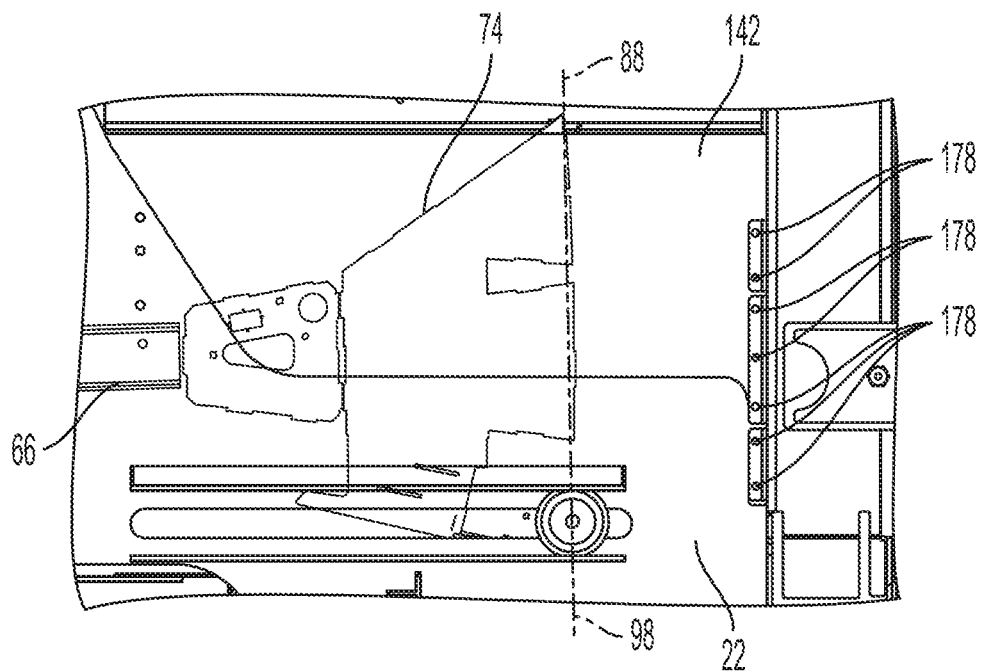
FIGS. 9 and 10 illustrate the frame and compression assembly of FIG. 5 in the rear dead center position.
Figure 10:
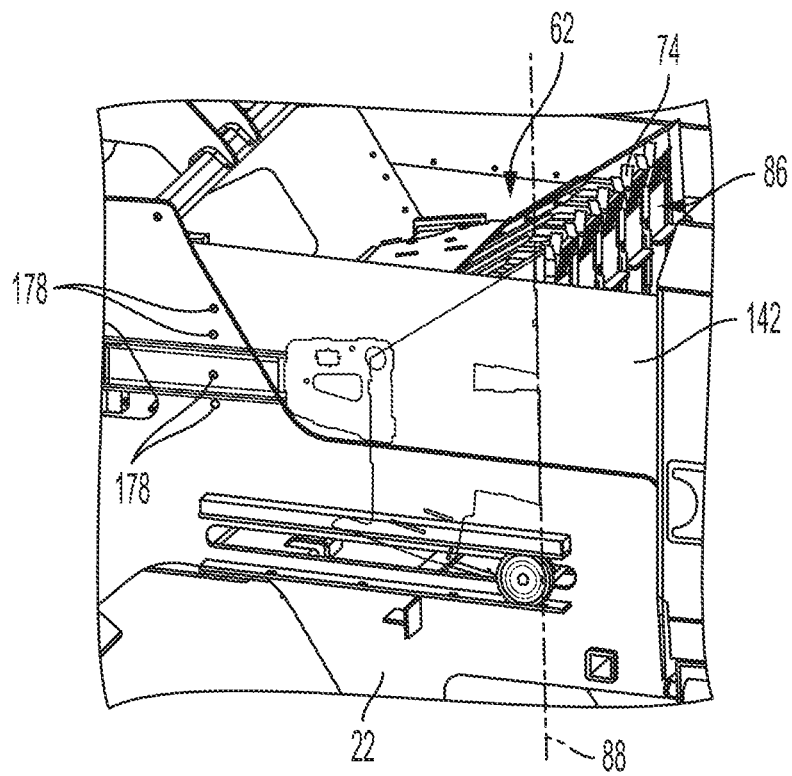

In the illustrated implementation, the leading edge 154 of each wall panel 134, 138, 142 is positioned ahead of the FDC 90 position of the plunger 74 such that the leading edge 154 is not located within the stroke region 106 (e.g., the third distance 162 is less than the first distance 94; see FIGS. 7 and 8). Similarly, the trailing edge 158 of each wall panel 134, 138, 142 is positioned behind of RDC 98 of the plunger 74 such that the trailing edge 158 is not located within the stroke region 106 (e.g., the fourth distance 166 is greater than the second distance 100; see FIGS. 9 and 10). Together, the distance between the leading edge 154 and the trailing edge 158 define a longitudinal panel length 170 that is greater than the stroke length 102 of the plunger 74 (see FIG. 2). Stated differently, the edges 154, 158 of each wall panel 134, 138, 142 are positioned such that the compression surface 86 of the plunger 74 does not cross either edge 154, 158 while reciprocating between FDC 90 and RDC 98, thereby minimizing any potential damage to the plunger 74 or panels 134, 138, 142 during use.

In the illustrated implementation, the first surface 146 of each wall panel 134, 138, 142 is substantially planar such that the first surface 146 defines a panel plane 174. However, in alternative implementations, the first surface 146 of one or more of the wall panels 134, 138, 142 may be contoured.

Figure 4:
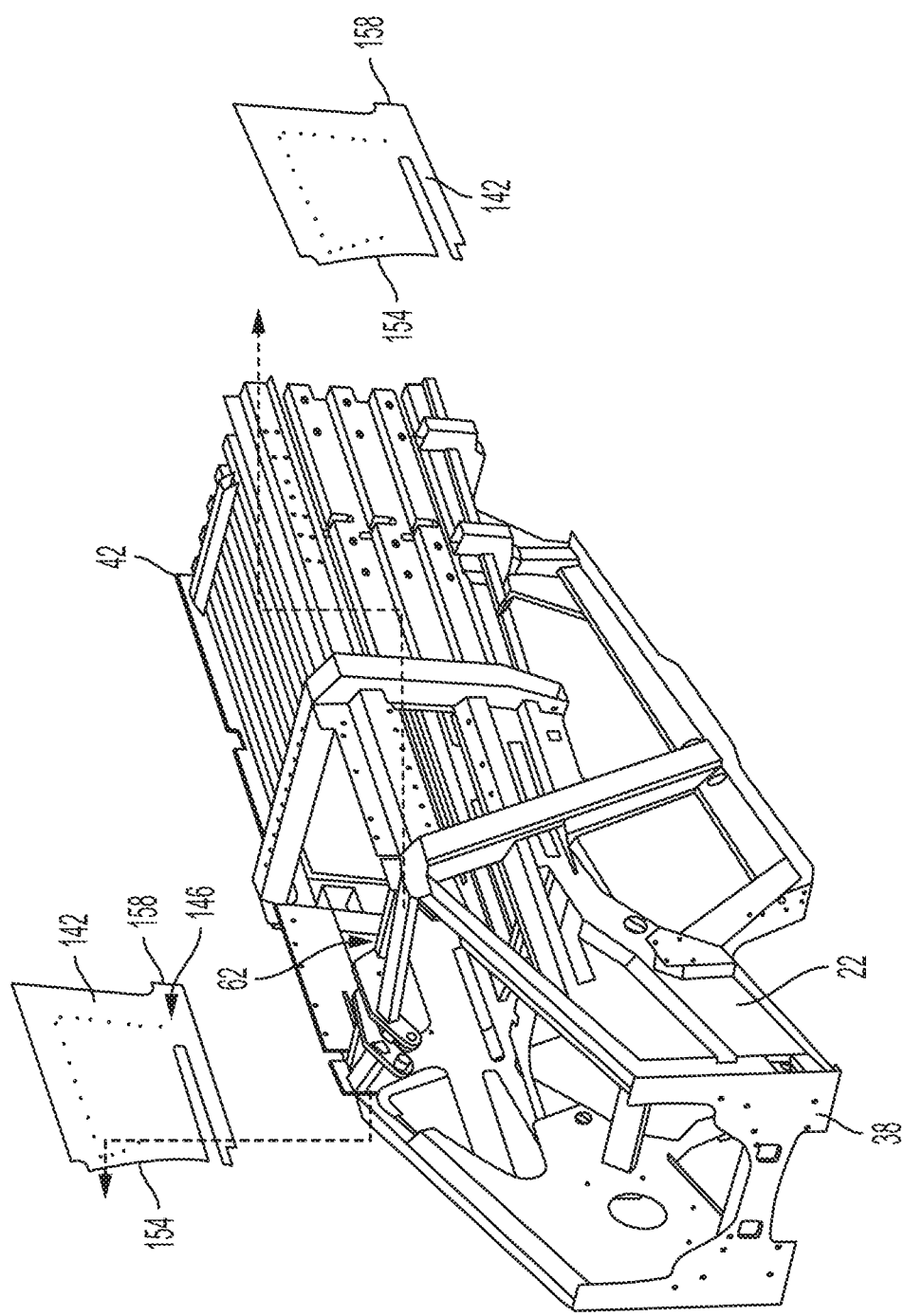
FIG. 4 is a perspective view of a frame of the large square baler of FIG. 1 and two panels removed therefrom.
Figure 5:
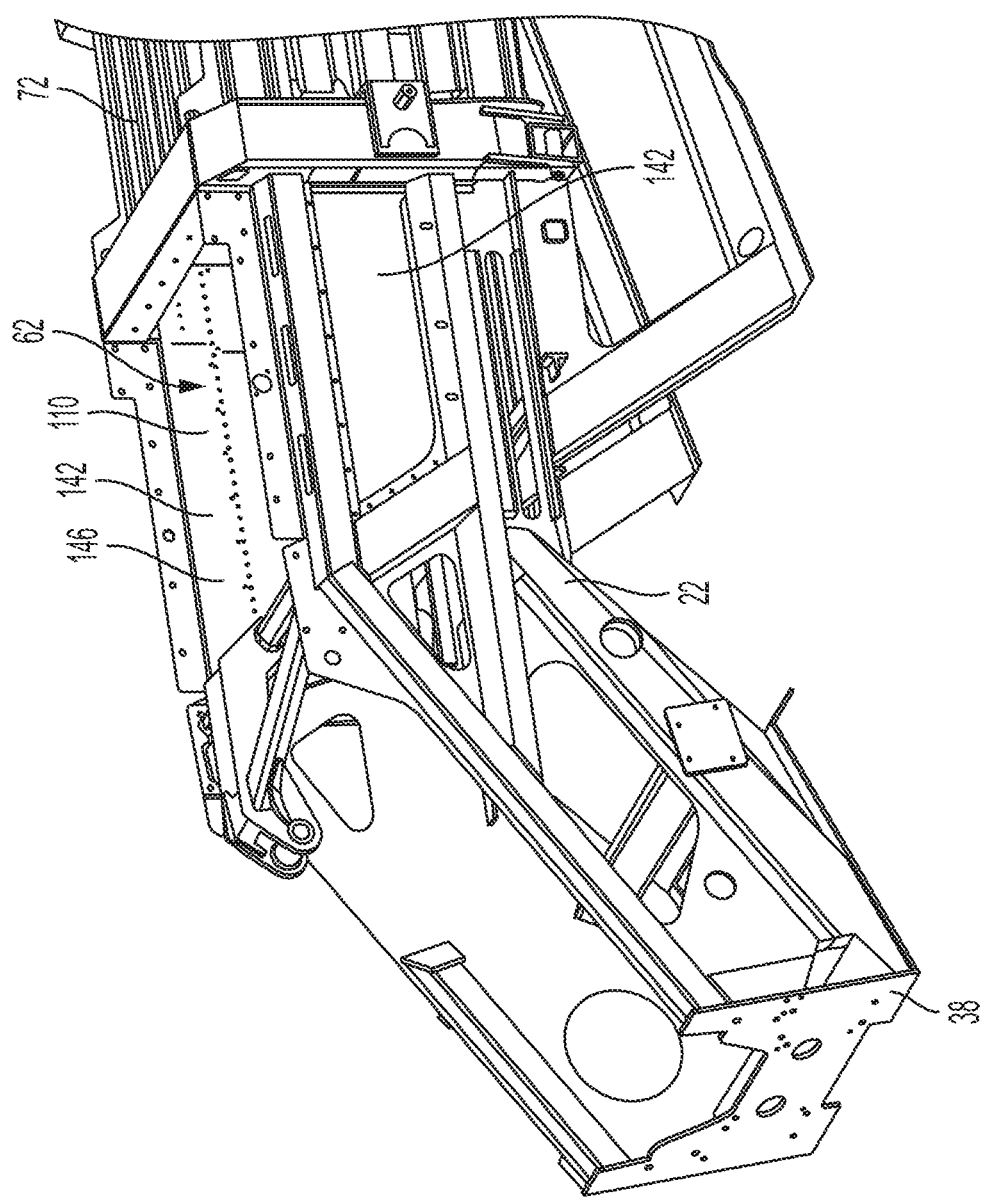
FIG. 5 is a perspective view of the frame of FIG. 4 with the two panels attached thereto.
Figure 6:
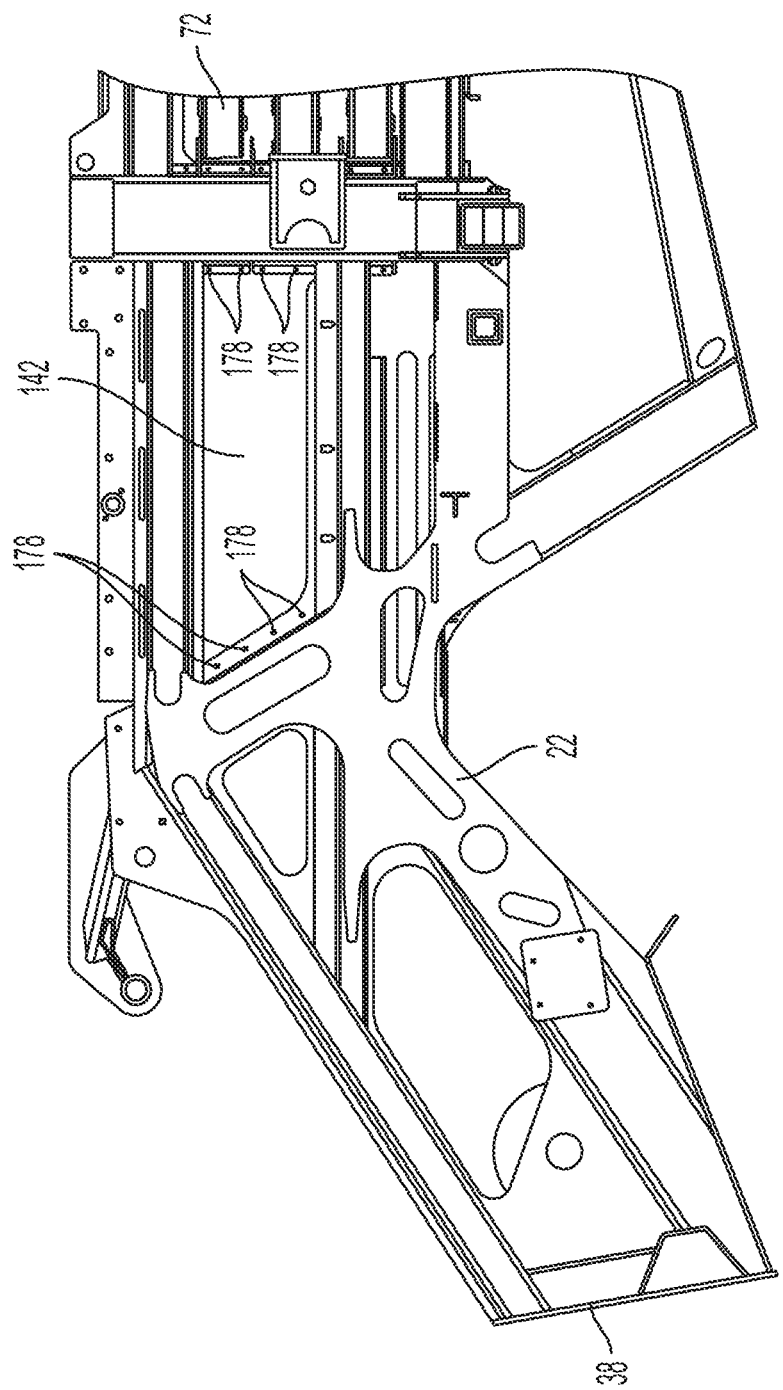
FIG. 6 is a side view of the frame and panels of FIG. 5.

As shown in FIG. 4, at least one wall panel 134, 138, 142 is removably attached to the main frame 22 such that removing a panel 134, 138, 142 from the frame 22 removes a corresponding "removable region 126" from the interior surface 110. More specifically, the at least one wall panel 134, 138, 142 is removably coupled to the frame 22 by one or more fasteners 178 such as bolts, clips, quarter-turn fasteners, and the like (see FIGS. 2-10). In the illustrated implementation, the fasteners 178 are positioned proximate to and spaced along both the leading edge 154 and the trailing edge 158 such that the fasteners 178 are located outside the plunger stroke region 106 (e.g., between the first end 38 and FDC 90 or between the second end 42 and RDC 98; see FIGS. 8-10). As such, the compression plane 88 of the plunger 74 does not pass over the fasteners 178 when reciprocating between RDC 98 and FDC 90.

In the illustrated implementation, the panels 134, 138, 142 are coupled to the frame 22 such that they are able move slightly along the panel plane 174 but cannot move perpendicular to the panel plane 174. Such movement allows for expansion and contraction within the panels 134, 138, 142 while not allowing the panels 134, 138, 142 to move into and out of the compression chamber 62 itself (e.g., the panels 134, 138, 142 cannot travel perpendicular to the longitudinal axis 68). In alternative implementations, the panels 134, 138, 142 may be completely fixed relative to the frame 22 when attached thereto.

The compression system 34 also includes a first datum 182 (see FIG. 3). The first datum 182 includes a plane coincident with the longitudinal axis 68 and oriented substantially parallel to the bottom surface 118 (e.g., substantially horizontal). As shown in FIG. 3, the side panels 142 are sized and shaped such that the first datum 182 passes therethrough. The compression system 34 also includes a second datum 186 that is coincident with the longitudinal axis 68 and oriented substantially perpendicular to the first datum 182 (e.g. substantially vertical). As shown in FIG. 3, the top and bottom panels 134, 138 are sized and shaped such that the second datum 186 passes therethrough.

While each of the panels 134, 138, 142 of the illustrated implementation are removable from the frame 22, in alternative implementations only a subset of the panels may be removable (e.g., only the panels corresponding to the side walls are removable) while other panels are permanently fixed to the frame (e.g., welded, riveted, bonded, and the like).

During operation of the baler 10, the plunger 74 reciprocates between the FDC 90 and RDC 98 as described above. During a compression stroke (e.g., when the plunger 74 moves from the FDC 90 toward the RDC 98) crop material 14 is injected into the compression chamber 62 by the feed system 30 whereby it is compressed against a forming bale 190 located in the bale case 72. As the plunger 74 moves toward RDC 98, the density of the crop material 14 increases which also causes a corresponding increase in the frictional wear against the interior surface 110. As the compression stroke is repeated, the plunger 74 and crop material 14 reciprocally exert forces against the interior surface 110 of the compression chamber 62 as the crop material 14. Furthermore, the movement of the plunger 74 and crop material 14 along the interior surface 110 causes frictional wear on the panels 134, 138, 142.

When the wear or damage to one or more of the panels 134, 138, 142 exceeds a predetermined limit, the user may remove the affected panels by detaching them from the frame 22 and replacing the removed panels with a corresponding replacement panel. By doing so, the user is able to maintain the compression chamber 62 without cutting into or significantly altering the frame 22.

Figure 11:
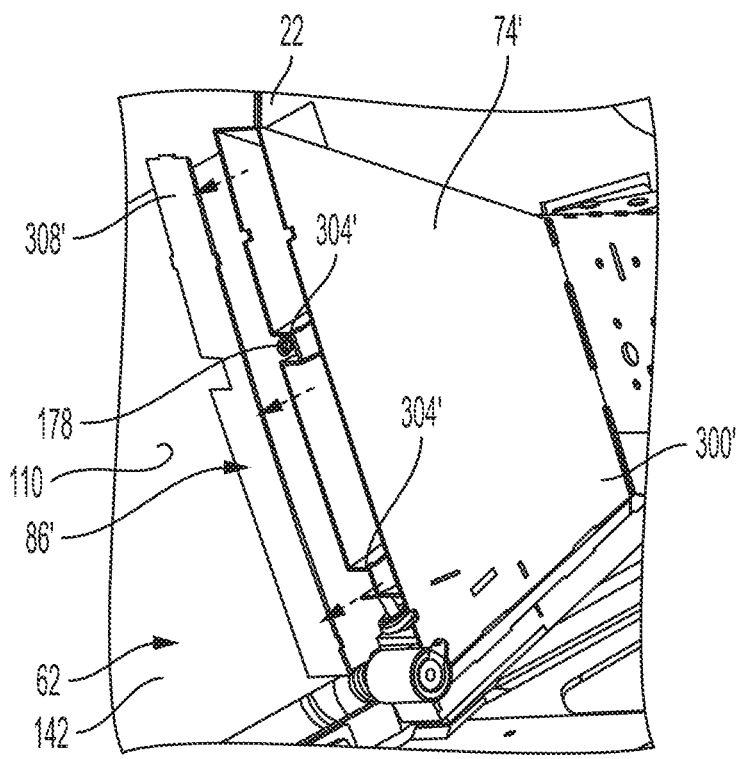
FIGS. 11-13 illustrate another implementation of the plunger of the compression assembly.
Figures 12, 13:
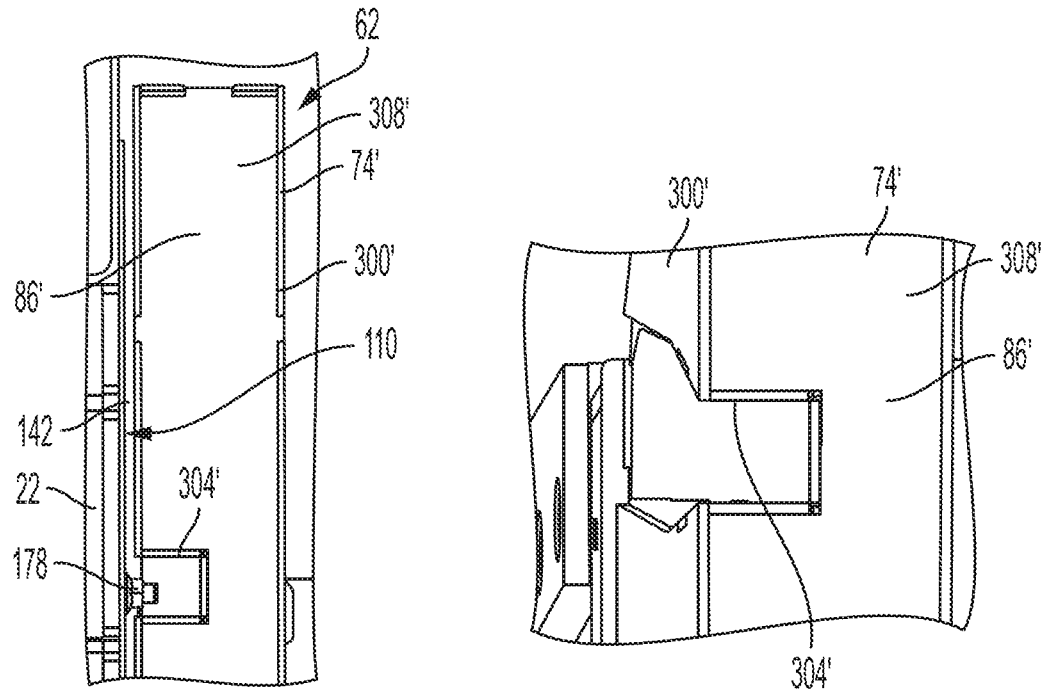

FIGS. 11-13 illustrate another embodiment of the plunger 74'. The plunger 74' is substantially similar to the plunger 74 illustrated in FIGS. 2-10. As such, only the differences will be described herein. The plunger 74' includes a body 300' that defines one or more fastener channels 304' therein. More specifically, each fastener channel 304' is open to the exterior of the body 300' and positioned adjacent the interior surface 110 of the compression chamber 62 such that the channel 304' aligns with and at least partially receives at least one fastener 178 of the one or more fasteners 178 therein. In the illustrated implementation, the plunger 74' includes four fastener channels 304', with two channels 304' positioned on either side thereof and each corresponding with and configured to receive fasteners 178 coupling the side panels 142 to the frame 22 therein. While the illustrated implementation shows the channels 304' associated with the side panels 142, it is to be understood that additional channels (not shown) may also be present that correspond with the top panel 134 and/or the bottom panel 138.

During use, the fastener channel 304' is sized and shaped such that the corresponding fasteners 178 can enter and exit the channel 304' as the plunger 74' reciprocates between the FDC 90 and RDC 98 positions. More specifically, the channel 304' is shaped so that the fasteners 178 are positioned within the channel 304' when the plunger 74' is in the FDC 90 position (see FIG. 11). By doing so, the channel 304' provides access the fasteners 178 when the plunger 74' is in the FDC 90 position. As such, the channel 304' permits the fasteners 178 positioned proximate both the leading edge 154 and the trailing edge 158 of the panel 142 to be accessed simultaneously and avoids the need to move the plunger 74' while detaching the corresponding panel.

The plunger 74' also includes a surface panel 308' removably coupled to the body 300' and at least partially defining the compression surface 86'. During use, the surface panel 308' is configurable in an attached position, in which the surface panel 308' is attached to the body 300' of the plunger 74' and restricting access to at least one of the fastener channels 304', and a detached position (see FIG. 11), in which the surface panel 308' is not attached to the body 300' and does not restrict access to the fastener channels 304'. While the illustrated implementation includes a single surface panel 308' defining the entire compression surface 86', in alternative implementations the plunger 74' may include multiple surface panels (not shown) each defining a portion of the compression surface 86' and selectively providing access to a subset of fastener channels 304'. In still other implementations, one or more surface panels 308' may be used in conjunction with a fixed compression surface portion that cannot be removed (not shown).

Figure 14:
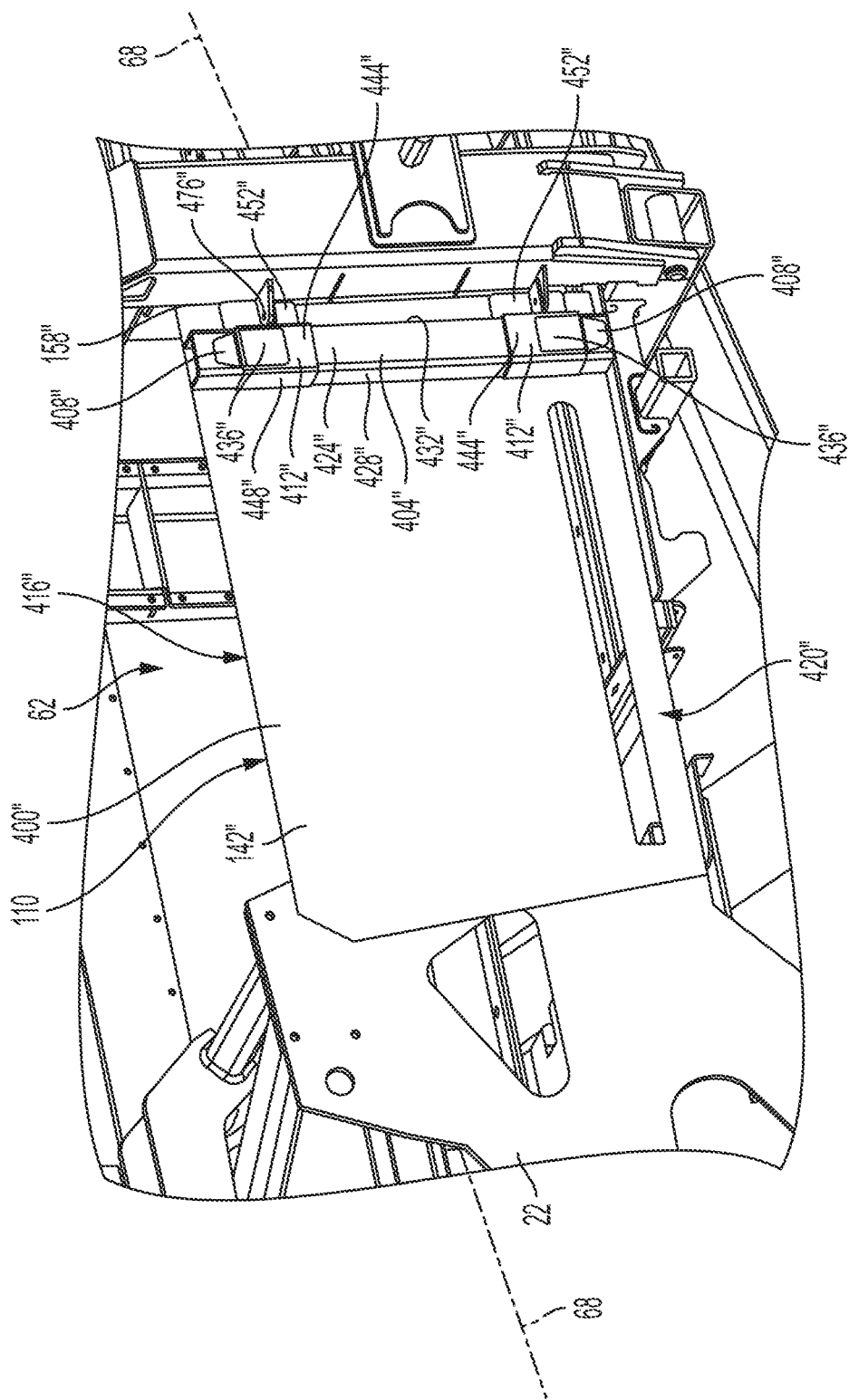
FIGS. 14-20 illustrate another implementation of a panel of the compression chamber.
Figure 15:
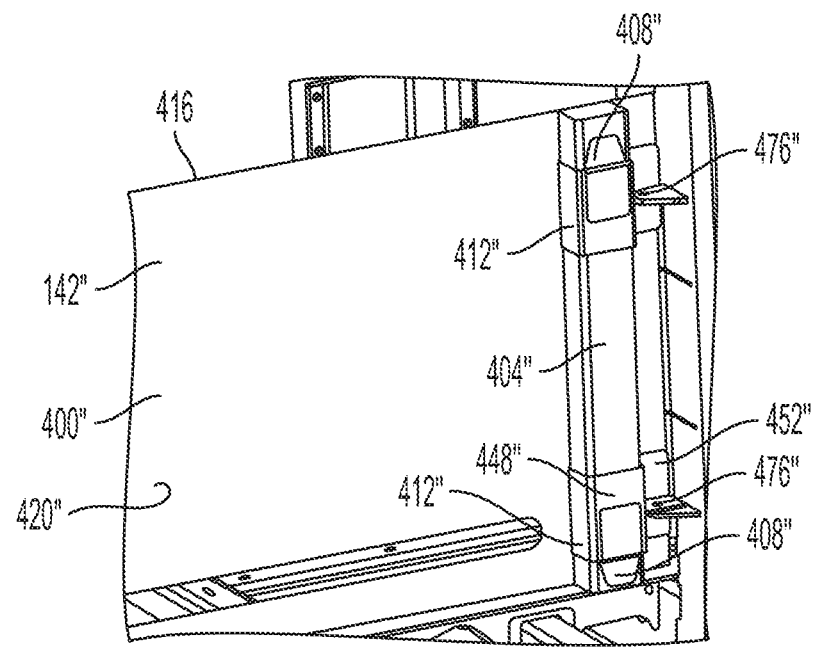
Figure 16:
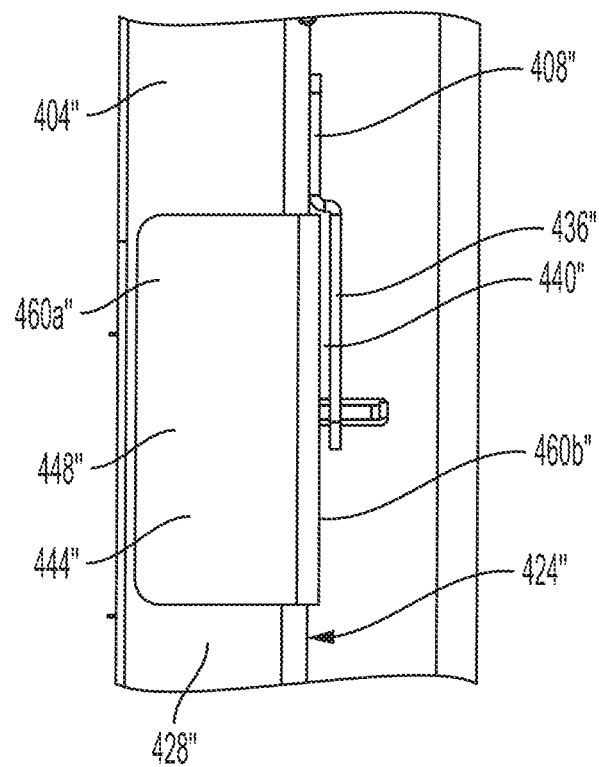

FIGS. 14-20 illustrate another implementation of a side panel 142". The side panel 142" is substantially similar to the side panel 142 described above and therefore only the differences will be described herein. The side panel 142" includes a substantially plate-like body 400", a reinforcing rib 404" coupled to the body 400", one or more clip members 408" coupled to the rib 404", and one or more mounting brackets 412" configured to extend between and be selectively coupled to both the side panel 142" and the frame 22. As shown in FIG. 14, the body 400" of the side panel 142" includes a first surface 416", configured to at least partially define a portion of the interior surface 110 of the compression chamber 62, and a second surface 420" opposite the first surface 416".

The rib 404" of the side panel 142" is substantially elongated in shape and is coupled to the second surface 420" of the body 400" proximate the trailing edge 158". When assembled, the rib 404" is configured to strengthen the body 400" of the side panel 142" while also acting as a mounting location for the clip members 408" and mounting brackets 412" (described below). In the illustrated implementation, the rib 404" includes rectangular member having an end face 424", a first side face 428" extending from the end face 424", and a second side face 432" extending from the end face 424" opposite the first side face 428".

The clip member 408" of the side panel 142" is configured to selectively engage and couple with a respective mounting bracket 412". More specifically, the clip member 408" is a substantially "S" shaped member having a first leg 436" extending therefrom. When assembled, the clip member 408" is coupled to the end face 424" of the rib 404" such that the first leg 436" is oriented substantially parallel to and spaced a distance from the end face 424" to form a gap 440" therebetween (see FIG. 16). While the illustrated implementation includes a separately formed clip member 408" coupled to the rib 404", in alternative implementation the clip member 408" and rib 404" may be integrally formed as a single unit.

The mounting bracket 412" of the side panel 142" includes a body 444" having a first portion 448" configured to be releasably coupled to the rib 404" of the side panel 142", and a second portion 452" configured to be releasably coupled the frame 22 of the baler 10.

Figure 19:
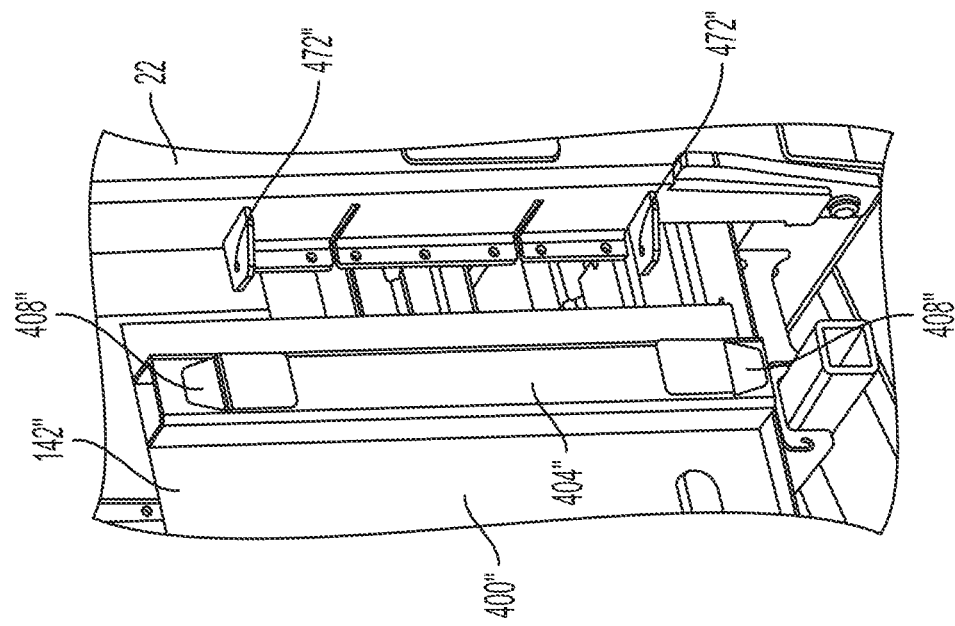
Figure 20:
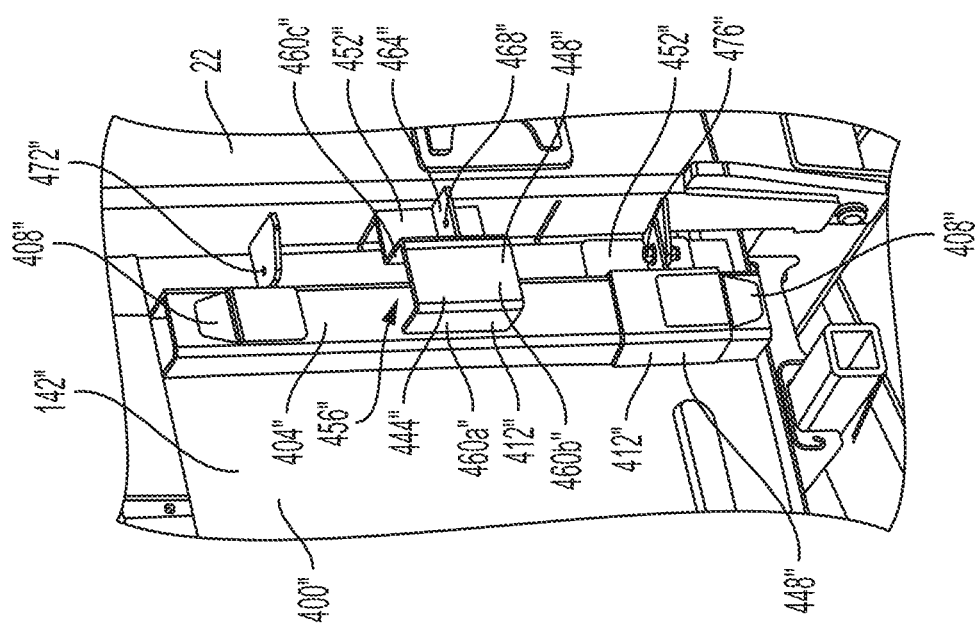

The first portion 448" of the body 444" is a substantially C-shaped member forming a pocket 456" sized and shaped to receive at least a portion of the rib 404" therein (see FIG. 19). More specifically, the first portion 448" includes a first leg 460a", configured to correspond with and engage the first side face 428" of the rib 404", a second leg 460b" configured to correspond with and engage the end face 424" of the rib 404", and a third leg 460c" configured to correspond with and engage the second side face 432" of the rib 404". When assembled, the second leg 460b is also sized such that it can be at least partially positioned within the gap 440" formed between the clip member 408" and the rib 404" (see FIG. 16).

When the first portion 448" is coupled to the rib 404", the engagement of the first and third legs 460a", 460c" engage the corresponding surfaces 428", 432", respectively, of the rib 404" and restrict relative motion between the mounting bracket 412" and the rib 404" in a direction parallel to the longitudinal axis 68 while still allowing the first portion 448" to slide along the length of the rib 404". Similarly, the interaction between the second leg 460b", the end face 424", and the clip member 408" restrict relative motion between the mounting bracket 412" and the rib 404" in a direction perpendicular to the longitudinal axis 68 while still allowing the first portion 448" to slide along the length of the rib 404".

The second portion 452" of the body 444" includes a mounting boss 464" defining a mounting aperture 468" configured to be placed in alignment with a corresponding aperture 472" of the frame 22. When the two apertures 468", 472" are aligned, a fastener 476" (e.g., a bolt and the like) may be passed through both apertures 468", 472" to secure the mounting bracket 412" to the frame 22, causing the two elements to become spatially fixed relative to one another.

To attach the side panel 142" to the frame 22, the user first orients the panel 142" in the desired position relative to the compression chamber 62 (e.g., making sure the first surface 416" is properly located). Once in position, the user then introduces the rib 404" of the side panel 142" into the pocket 456" of the mounting bracket 412". The user continues to introduce the rib 404" into the pocket 456" until the first leg 460a" contacts the first side face 428", the third leg 460c" contacts the second side face 432", and the second leg 460b" contacts the end face 424" (see FIG. 18). The user may then slide the mounting bracket 412" along the length of the rib 404" until the second leg 460b" is at least partially located within the gap 440" formed between the rib 404" and the clip 408" (see FIG. 17).

With the mounting bracket 412" in location, the user may then verify the alignment of the aperture 468" of the bracket 412" with the corresponding aperture 472" of the frame 22 and insert the fastener 476" therethrough. Upon fastening the fastener 476", the panel 142" is secured and ready for baling operations.

Figure 17:
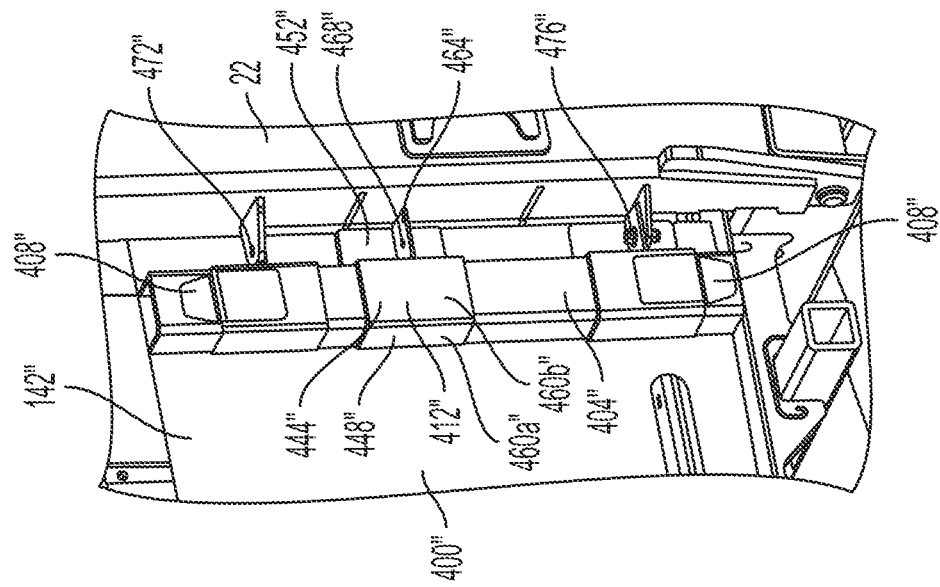
Figure 18:
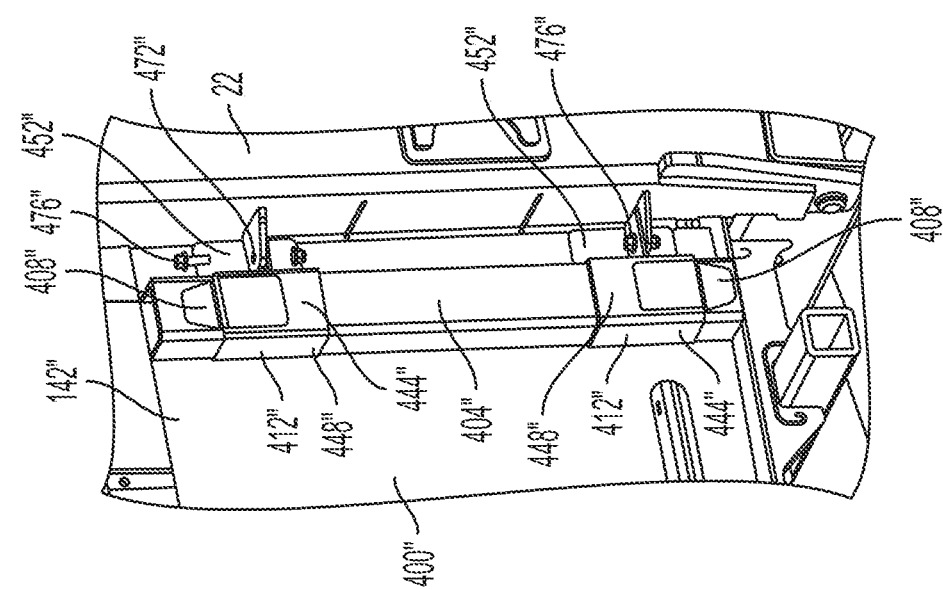

To remove a damaged or worn the side panel 142" from the frame 22, the user first unfastens the fastener 476" and removes it from both apertures 468", 472" (see FIG. 17). With the fastener 476" removed, the user then slides the mounting bracket 412" along the length of the rib 404" until the second leg 460b" is completely removed from the gap 440" (see FIG. 18). After the second leg 460b" is clear from the gap 440", the user may then completely detach the mounting bracket 412" from the rib 404" (e.g. remove the rib 404" from the pocket 456"; see FIG. 19). With the mounting bracket 412" completely removed, the user may remove the panel 142" from the frame 22 (see FIG. 20.).

While the above implementation is illustrated relative to a side panel 142", it is to be understood that in alternative implementations the top and/or bottom panels may also use a similar mounting mechanism. Furthermore, while the illustrated implementation includes a single rib 404" located proximate the trailing edge 158" using two mounting brackets 412"; in alternative implementations, more or fewer mounting brackets 412" may be used. Still further, additional ribs 404" and additional brackets 412" may be present for any particular panel (not shown).

Various features of the disclosure are set forth in the following claims.

What is claimed is:

1. A baler comprising:
    a frame including a first end, and a second end opposite the first end;
    a compression chamber, and wherein the compression chamber defines a central axis extending longitudinally therethrough;
    a plunger assembly at least partially positioned and movable within the compression chamber; and
    a panel removably coupled to the frame, and wherein the panel at least partially defines the compression chamber;
    wherein the plunger assembly includes a plunger, wherein the plunger reciprocates within the compression chamber between a first position, in which the plunger is positioned a first distance from the first end, and a second position, in which the plunger is positioned a second distance from the first end, and wherein the plunger assembly defines a stroke length between the first position and the second position;

wherein the panel includes a first edge, and wherein the first edge is positioned a third distance from the first end that is less than the first distance; and wherein the panel includes a second edge, and wherein the second edge is positioned a fourth distance from the first end that is greater than the second distance.

2. The baler of claim 1, wherein the panel defines a longitudinal length along the central axis, and wherein the axial length of the panel is greater than the stroke length.

3. The baler of claim 1, wherein the panel is removably coupled to the frame with one or more fasteners, wherein the plunger defines a plunger stroke region between the first position and the second position, and wherein each fastener of the one or more fasteners is positioned outside the plunger stroke region.

4. The baler of claim 1, wherein the panel is removably coupled to the frame with one or more fasteners.

5. The baler of claim 1, further comprising a second panel removably coupled to the frame, and wherein the second panel at least partially defines the compression chamber.

6. The baler of claim 1, wherein the panel defines a panel plane, and wherein when the panel is attached to the frame, the panel is movable along the panel plane but fixed perpendicular to the panel plane.

7. The baler of claim 1, wherein the central axis is located at the cross-sectional center of the compression chamber, and wherein the baler includes a reference plane aligned with the central axis and oriented substantially horizontally, and wherein the reference plane passes through the panel.

8. The baler of claim 1, wherein the frame defines an overall length between the first end and the second end, wherein the panel defines an axial panel length measured along the central axis, and wherein the axial panel length is shorter than the overall length.

* * * * *